Oct. 17, 1933.        D. E. NORRIS        1,930,982
OIL WELL STUFFING BOX
Filed Oct. 21, 1930
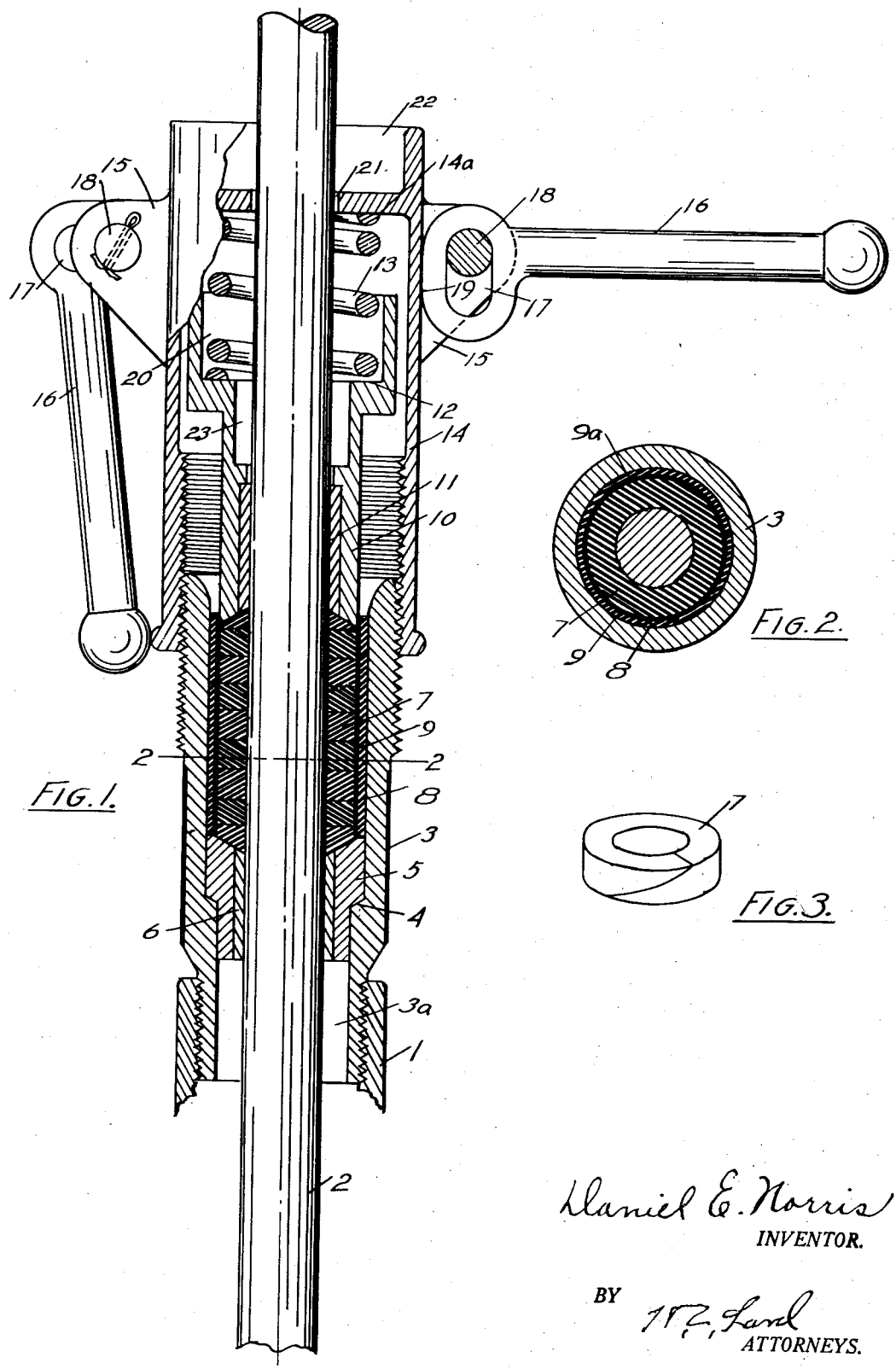
Daniel E. Norris
INVENTOR.
BY
ATTORNEYS.

Patented Oct. 17, 1933

1,930,982

UNITED STATES PATENT OFFICE 1,930,982

OIL WELL STUFFING BOX

Daniel E. Norris, Robinson, Ill., assignor to Norris Brothers, Incorporated, Robinson, Ill., a corporation of Illinois Application October 21, 1930. Serial No. 490,135

1 Claim. (Cl. 286—30)

Oil well stuffing boxes are ordinarily provided with packing material which is of standard size. With some types of pumps and stuffing boxes such standard size of packing cannot be used because of the enlargement of the stuffing box as a whole. The present invention is intended to obviate this difficulty. The present invention also involves a simple and effective means for exerting pressure on the follower of the stuffing box and for lubricating the packed joint around the sucker rod. Features and details of the invention will appear from the specification and claim.

A preferred embodiment of the invention is illustrated in the accompanying drawing as follows:—

Fig. 1 shows a central section through the stuffing box.

Fig. 2 a section on the line 2—2 in Fig. 1.

Fig. 3 perspective view of one of the packing rings.

1 marks the well tubing and 2 the sucker rod.

The body 3 of the stuffing box has a screw-threaded bottom which is screwed into the top coupling of the tubing 1. It has a shoulder 4 near its bottom which supports a bushing 5, the bushing 5 having a wearing sleeve 6 around the sucker rod. An opening 3a through the body should be large enough to permit the withdrawal of the pump parts with the sucker rod. Thus these parts may be removed without removing the stuffing box from the tubing.

Packing rings 7 are arranged above the bushing 5. These are of standard size. In as much as the same size polished rod is usually used with different sizes of pump parts it is possible to use standard sizes of packing rings, but this involves a sufficiently large opening 3a to permit the removal of the larger pump parts and this in consequence, if standard packing rings are used, leaves a space between the outer periphery of these packing rings and the inner wall of the body 3 of the stuffing box. I provide a flexible sleeve 8 which fills this space. This is preferably formed of rubber and fabric yielding slightly with the expansion of the packing rings. In order that the packing rings may be set up more readily a thin sheet metal lining 9 is arranged within the sleeve 8. This sleeve is open at 9a permitting it to yield with the flexible sleeve.

A follower 10 operates on the packing rings within the lining 9 in the usual manner. It is provided with a wearing sleeve 11. It has a seat 12 at its upper end on which a spring 13 rests, the spring being engaged by a shoulder 14a in an adjusting sleeve 14, the adjusting sleeve having internal screw threads operating on external screw threads on the body 3. By screwing down the sleeve 14 the desired pressure may be exerted on the spring 13 and this communicated by the follower 10 to the packing rings to close the joint.

In order to readily adjust the sleeve operating handles are provided. Ears 15 extend from the sides of the sleeve. Handles 16 are arranged between these ears. The handles have cross slots 17 at their ends and pins 18 extending between the ears 15 pass through these slots. The inner wall of the handle is so related to the slots 17 through the thickness of the wall around the slot as to assure the engagement of the end 19 of the handle when the pin 18 is arranged in the upper end of the slot and thus locking the handle in a horizontal position, as shown at the right of Fig. 1.

On the other hand the wall of the handle at the bottom of the slot 17 is such that when the handle is raised relatively to the pin the handle will swing down, as shown at the left of Fig. 1.

It is desirable to properly and continuously lubricate the packed joint. To this end I provide a cup 20, above the seat 12, which communicates through the follower with the joint and this is below an opening 21 formed in the shoulder 14a so that a lubricant poured into a cup 22 in the upper end of the sleeve 14 passes through the opening 21 and is caught by the cup 20 and is carried by a passage 23 to the joint. Thus a considerable quantity of lubricant can be provided and it is so protected that this lubricant is retained and thus utilized.

What I claim as new is:—

In an oil well stuffing box, the combination of a body having a packing-receiving chamber; a packing in the body; a follower operating on the packing; means exerting pressure on the follower having a screw-threaded connection with the body; ears on said means; a pin extending between the ears; and a handle having a cross slot through which the pin extends, the inner end of the handle engaging the means to maintain the handle in a longitudinal position with the pin in the upper part of the slot and spaced from the slot to swing on the pin with the pin in the lower part of the slot.

DANIEL E. NORRIS.